(12) United States Patent
Bialer

(10) Patent No.: US 10,690,769 B2
(45) Date of Patent: Jun. 23, 2020

(54) TARGET ANGLE DETERMINATION USING VEHICLE RADAR ELEMENTS WITH LOCAL REFERENCE SIGNALS

(71) Applicant: GM Global Technology Operations LLC, Detroit, MI (US)

(72) Inventor: Oded Bialer, Petah Tivak (IL)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 236 days.

(21) Appl. No.: 15/679,534

(22) Filed: Aug. 17, 2017

(65) Prior Publication Data

US 2019/0056489 A1  Feb. 21, 2019

(51) Int. Cl.

| | |
|---|---|
| *G01S 13/931* | (2020.01) |
| *G01S 13/34* | (2006.01) |
| *G01S 13/36* | (2006.01) |
| *G01S 13/87* | (2006.01) |
| *B60R 21/013* | (2006.01) |
| *G01S 13/02* | (2006.01) |

(52) U.S. Cl.
CPC .......... *G01S 13/931* (2013.01); *G01S 13/34* (2013.01); *G01S 13/36* (2013.01); *G01S 13/878* (2013.01); *B60G 2400/823* (2013.01); *B60G 2401/174* (2013.01); *B60R 2021/01315* (2013.01); *B60W 2420/52* (2013.01); *G01S 2013/0245* (2013.01); *G01S 2013/93271* (2020.01)

(58) Field of Classification Search
CPC ........ G01S 13/931; G01S 13/34; G01S 13/36; G01S 13/878
USPC .............................................. 342/70
See application file for complete search history.

(56) References Cited

U.S. PATENT DOCUMENTS

| | | | | |
|---|---|---|---|---|
| 7,978,747 B1* | 7/2011 | Harris | ..................... | H04B 1/707 370/328 |
| 8,933,840 B2* | 1/2015 | Hosoya | ................... | H01Q 3/267 342/373 |
| 2002/0022465 A1* | 2/2002 | McCullagh | ............. | G01S 19/36 455/260 |
| 2017/0184699 A1* | 6/2017 | Honma | ................... | G01S 3/043 |

* cited by examiner

*Primary Examiner* — Bo Fan
(74) *Attorney, Agent, or Firm* — Cantor Colburn LLP

(57) ABSTRACT

A method and system to determine angle of arrival of a target include one or more transmitters, one or more receivers, and one local oscillator to provide a local reference signal each in two or more transceiver nodes. The system also includes a controller to determine obtained phase differences for each of the two or more transceiver nodes. Each of the obtained phase differences is between a signal transmitted by one of the one or more transmitters and received by one of the one or more receivers of a same one of the two or more transceiver nodes. The controller estimates the angle of arrival of the target based on the obtained phase differences determined for the two or more transceiver nodes.

11 Claims, 4 Drawing Sheets

TARGET ANGLE DETERMINATION USING VEHICLE RADAR ELEMENTS WITH LOCAL REFERENCE SIGNALS

INTRODUCTION

The subject disclosure relates to target angle determination using vehicle radar elements with local reference signals.

In a vehicle (e.g., automobile, truck, construction equipment, farm equipment, automated factory equipment), various sensor systems may be used to automate or augment vehicle operation such as steering, braking, and the like. Vehicles may use a radar system with high angular resolution to facilitate target detection and tracking that, in turn, facilitates the desired automation or augmentation of vehicle operation. Typically, the angle to a target is determined by comparing the phase of a received signal (i.e., signal transmitted by the radar system and reflected by the target) at two or more antenna elements to the phase of a common reference signal. This phase difference between the received signal phase and reference signal phase at each element is a function of the angle of arrival of the received signal. The use of the common reference signal at each element requires accurate synchronization of the elements such that the multiple phase differences may be used to estimate the angle to the target. However, the carrier frequency generally used in vehicle radar systems may be on the order of 77 gigahertz (GHz). The effect of path length on attenuation increases with frequency such that the distribution of a common reference signal on the order of 77 GHz over the distances required for vehicle radar systems is impractical. Accordingly, it is desirable to provide target angle determination using vehicle radar elements with local reference signals rather than a common reference signal.

SUMMARY

In one exemplary embodiment, a system to determine angle of arrival of a target includes one or more transmitters, one or more receivers, and one local oscillator to provide a local reference signal each in two or more transceiver nodes. The system also includes a controller to determine obtained phase differences for each of the two or more transceiver nodes. Each of the obtained phase differences is between a signal transmitted by one of the one or more transmitters and received by one of the one or more receivers of a same one of the two or more transceiver nodes. The controller estimates the angle of arrival of the target based on the obtained phase differences determined for the two or more transceiver nodes.

In addition to one or more of the features described herein, the controller stores a matrix A. Each column of the matrix A is associated with a different target position and each row of the matrix A is associated with a different one of the one or more receivers of the two or more transceiver nodes.

In addition to one or more of the features described herein, each column of matrix A is comprised of a vector $a(u_i)$ for a target position $u_i$:

$$a(u_i) = [e^{j\phi 0}\ e^{j\phi 1}\ \ldots\ e^{j\phi R}]^T,\ \text{where}$$

T indicates transpose, each $\phi$ corresponds to an actual phase difference between a transmitted signal and a received signal with the same one of the two or more transceiver nodes when the target is at the target position $u_i$ and indexes 0 to R indicate a total of R receivers within the two or more transceiver nodes.

In addition to one or more of the features described herein, the controller obtains a vector y based on the obtained phase differences.

In addition to one or more of the features described herein, the controller estimates the angle of arrival of the target using a vector w based on:

$$w = |A^H y|,\ \text{where}$$

H indicates a Hermitian transpose.

In addition to one or more of the features described herein, each element of the vector w corresponds with an angle of arrival for a different position of the target.

In addition to one or more of the features described herein, the controller determines the angle of arrival of the target based on which element of the vector w has maximal values.

In addition to one or more of the features described herein, the system is in a vehicle.

In addition to one or more of the features described herein, the controller is coupled to a vehicle system that uses the angle of arrival of the target to perform autonomous driving, collision avoidance, or adaptive cruise control.

In another exemplary embodiment, a method of determining angle of arrival of a target includes transmitting a signal from each of one or more transmitters of each of two or more transceiver nodes. The signal transmitted from each of the two or more transceiver nodes is generated based on a different local reference signal. The method also includes receiving a resulting reflection signal at each of one or more receivers. The receiving the resulting reflection signal is based on a transmission from a same one of the two or more transceiver nodes. Obtained phase differences are determined for each of the two or more transceiver nodes. Each of the obtained phase differences is between a signal transmitted by one of the one or more transmitters and received by one of the one or more receivers of a same one of the two or more transceiver nodes. The angle of arrival of the target is determined based on the obtained phase differences determined for the two or more transceiver nodes.

In addition to one or more of the features described herein, a matrix A is stored. Each column of the matrix A is associated with a different target position and each row of the matrix A is associated with a different one of the one or more receivers of the two or more transceiver nodes.

In addition to one or more of the features described herein, storing the matrix A includes each column of the matrix A including a vector $a(u_i)$ associated with a target position $u_i$:

$$a(u_i) = [e^{j\phi 0}\ e^{j\phi 1}\ \ldots\ e^{j\phi R}]^T,\ \text{where}$$

T indicates transpose, each $\phi$ corresponds to an actual phase difference between a transmitted signal and a received signal with the same one of the two or more transceiver nodes when the target is at the target position $u_i$ and indexes 0 to R indicate a total of R receivers within the two or more transceiver nodes.

In addition to one or more of the features described herein, a vector y is obtained based on the obtained phase differences.

In addition to one or more of the features described herein, estimating the angle of arrival of the target includes using a vector w based on:

$$w = |A^H y|,\ \text{where}$$

H indicates a Hermitian transpose.

In addition to one or more of the features described herein, estimating the angle of arrival using the vector w includes each element of the vector w corresponding with an angle of arrival for a different position of the target.

In addition to one or more of the features described herein, the angle of arrival of the target is determined based on which element of the vector w has maximal values.

In addition to one or more of the features described herein, the angle of arrival of the target is provided to a vehicle system that uses the angle of arrival of the target to perform autonomous driving, collision avoidance, or adaptive cruise control.

In addition to one or more of the features described herein, transmitting the signal is at a frequency of 77 gigahertz.

In another exemplary embodiment, a method of fabricating a system to determine angle of arrival of a target includes assembling two or more transceiver nodes to each include one or more transmitters, one or more receivers, and one local oscillator to generate a local reference signal. The method also includes coupling a controller to the two or more transceiver nodes to determine the angle of arrival of the target based on determining obtained phase differences for each of the two or more transceiver nodes. Each of the obtained phase differences is between a signal transmitted by one of the one or more transmitters and received by one of the one or more receivers of a same one of the two or more transceiver nodes.

In addition to one or more of the features described herein, the system is coupled to a vehicle system in a vehicle. The vehicle system uses the angle of arrival of the target to perform autonomous driving, collision avoidance, or adaptive cruise control.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
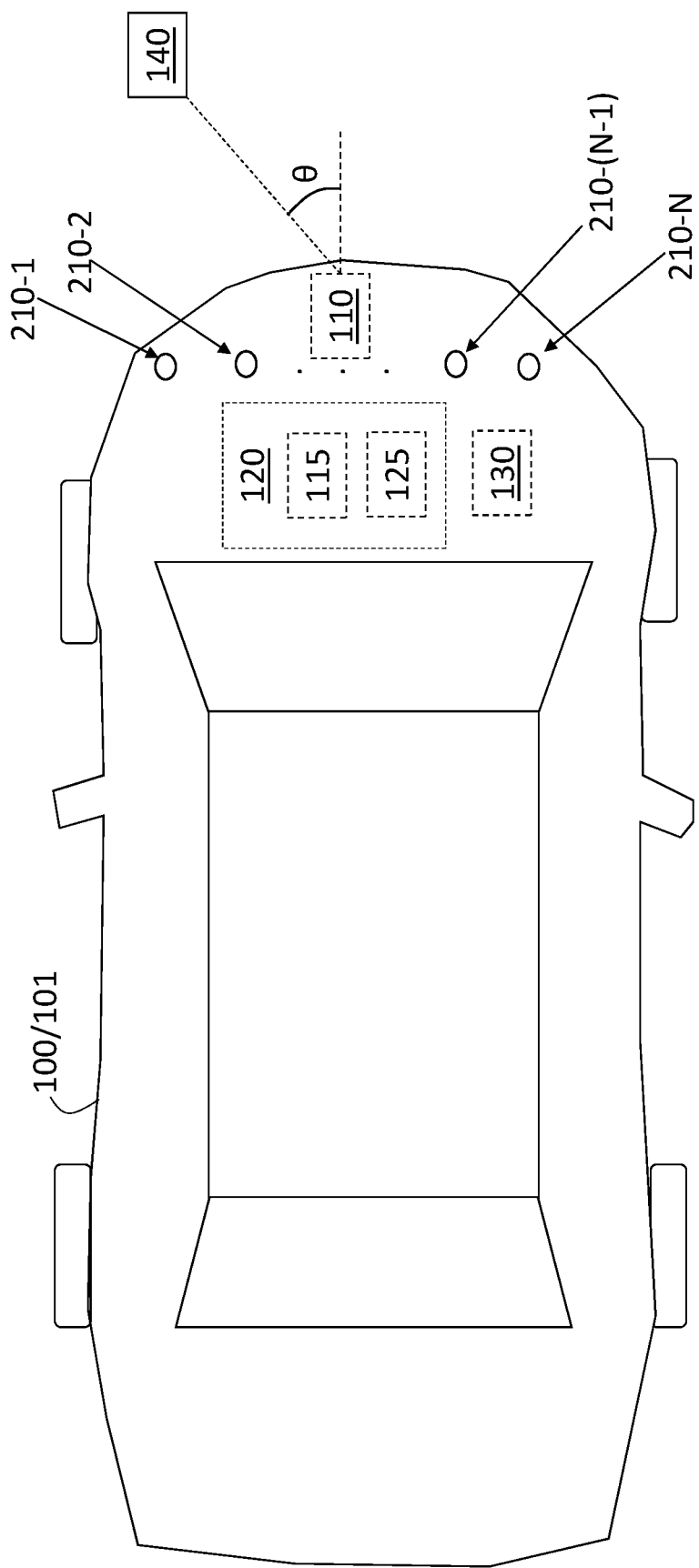
FIG. 1 is a block diagram of a system to determine target angle using vehicle radar elements with local reference signals.

The following description is merely exemplary in nature and is not intended to limit the present disclosure, its application or uses. It should be understood that throughout the drawings, corresponding reference numerals indicate like or corresponding parts and features.

As previously noted, using a common reference signal for each element of the vehicle radar system requires accurate synchronization of the phase difference determined by each receiver antenna element. A common reference signal means that each of the transmitters of the radar system obtains and processes a signal from the same radio frequency (RF) carrier frequency oscillator. In this case, the phase differences among signals received at all receivers are generally used to determine the angle to a target. Yet, using a common reference signal spanned over the dimension of the vehicle is infeasible at the high frequencies (e.g., 77 GHz) needed for the carrier signal because of the high attenuation over the distances involved. Embodiments of the systems and methods detailed herein relate to determining target angle using vehicle radar elements with local reference signals. The radar system includes two or more nodes, each with one or more transmit antenna elements and one or more receive antenna elements. Each of the nodes uses a different local reference signal obtained from a different local oscillator. As a result, phase differences among signals received by receivers in different nodes cannot be used for accurate target angle of arrival determination. According to the embodiments, angle of arrival of the target to the vehicle is instead determined based on the received signals in each of the nodes, as detailed herein.

In accordance with an exemplary embodiment, FIG. 1 is a block diagram of a system to determine target angle using vehicle radar elements with local reference signals. The vehicle 100 shown in FIG. 1 is an automobile 101. The vehicle 100 includes a radar system 110 that is further discussed with reference to FIG. 2. Exemplary transceiver nodes 210-1 through 210-N (generally referred to as 210) of the radar system 110 are indicated in FIG. 1. An exemplary target 140 that may be detected by the radar system 110 is shown in FIG. 1. The determination of angle of arrival θ to the target 140 with respect to the center point of the array of transceiver nodes 210 is performed, according to one or more embodiments, by a controller 120.

The controller 120 includes processing circuitry that may include an application specific integrated circuit (ASIC), an electronic circuit, a processor 115 (shared, dedicated, or group) and memory 125 that executes one or more software or firmware programs, as shown in FIG. 1, a combinational logic circuit, and/or other suitable components that provide the described functionality. The controller 120 may provide information about the target 140 to one or more vehicle systems 130. The vehicle systems 130 may include a collision avoidance system, adaptive cruise control system, or fully autonomous driving system, for example. The vehicle systems 130 use the target information to augment or automate vehicle operation.

Figure 2:
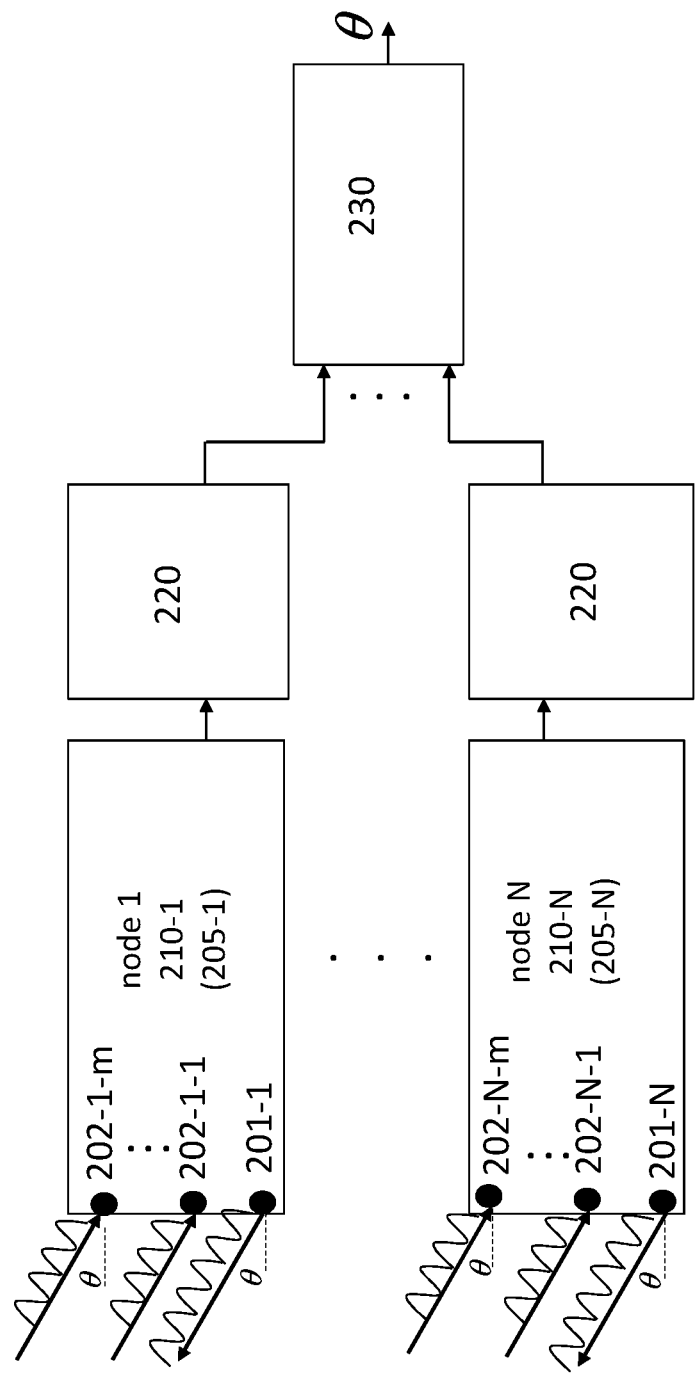
FIG. 2 is a process flow of a method of determining angle of arrival using local reference signals according to one or more embodiments.

FIG. 2 is a process flow of a method of determining angle of arrival θ using local reference signals according to one or more embodiments. FIG. 2 shows that the exemplary radar system 110 includes N nodes 210-1 through 210-N (generally referred to as 210). Transmitters 201-1 through 201-N (generally referred to as 201) and receivers 202-1-1 through 202-N-m (generally referred to as 202) are disposed in each node 210. Specifically, in the exemplary embodiment, one transmitter 201 and m receivers 202 are part of each node 210. Different local reference signals 205-1 through 205-N (generally referred to as 205) are associated with each node 210. The transmitters 201 in each node transmit in turn, according to a time division multiplexing scheme, or simultaneously, according to a frequency or code division multiplexing scheme. For the receivers 202 in any given node 210, only the reflections resulting from transmission by the transmitter 201 in the same node 210 are of interest. The transmitter 201 and receivers 202 of a given node use the same local reference signal 205. In alternate embodiments, each node 210 may have more than one transmitter 201 or only one receiver 202.

At block 220, processes include determining local phase differences. Local phase difference refers to the difference between the phase of the signal transmitted by the transmitter 201 and received by a given receiver 202 within the same node 210. For example, when transmitter 201-1 of node 210-1 transmits a signal, the difference between the phase of that transmitted signal and the phase of the signal received at receiver 202-1-1 is determined at block 220. The difference in phase between the same transmitted signal and the signal received at each of the receivers 202-1-2 through 202-1-$m$ is also determined. Thus, at each block 220, m phase differences are determined and recorded based on the one transmitter 201 and m receivers 202 in each node 210. When each transceiver node 210 includes q transmitters 201 rather than one, as shown in the example, the phase difference between each of the q transmitters 201 and every one of the m receivers 202 (i.e., m phase differences per transmitter 201) are determined. At block 230, the m phase differences determined at the N nodes 210 are used to estimate the position of the target 140 as further detailed with reference to FIG. 3.

Figure 3:
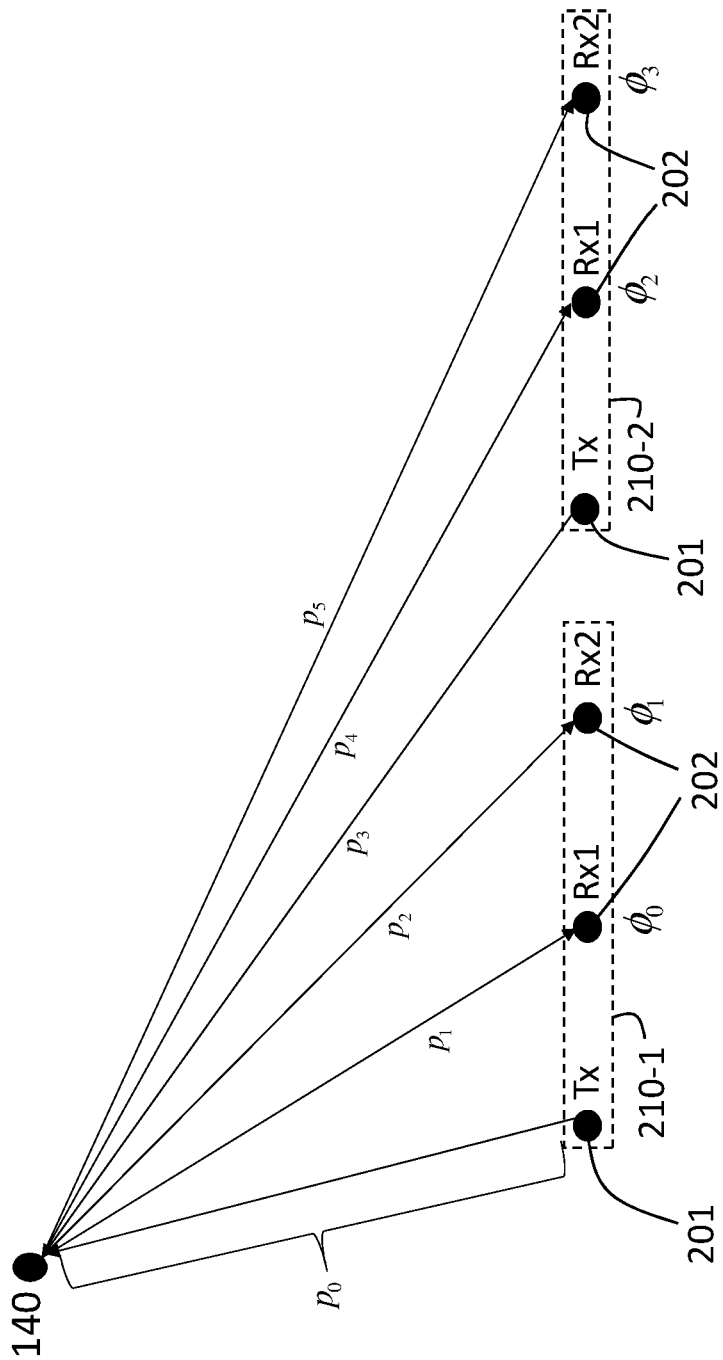
FIG. 3 shows an exemplary target whose position is determined according to one or more embodiments.

FIG. 3 shows an exemplary target 140 whose position is determined according to one or more embodiments. For explanatory purposes, two nodes 210-1, 210-2, each with one transmitter 201 Tx and two receivers 202 Rx1 and Rx2, are shown. The phase shift in the signal received at each of the receivers 202 is indicated in FIG. 3. Each phase shift can be expressed in terms of the distance that the associated signal travels. For example, the phase shift at the receiver 202 Rx1 in node 1 is a function of the distance $p_0$ from the transmitter 201 Tx in node 1 to the target 140 and the distance $p_1$ from the target 140 to the receiver 202 Rx1 in node 1, because $p_0+p_1$ is the total distance travelled by the signal that reaches the receiver 202 Rx1 in node 1. As another example, the phase shift at the receiver 202 Rx2 in node 2 is a function of the distance $p_3$ from the transmitter 201 Tx in node 2 to the target 140 and the distance $p_5$ from the target 140 to the receiver 202 Rx2 in node 2, because $p_3+p_5$ is the total distance travelled by the signal that reaches the receiver 202 Rx2 in node 2. The phase differences are expressed according to distance below:

$$\phi_0 = 2\pi\left(\frac{p_0 + p_1}{\lambda}\right) \quad [\text{EQ. 1}]$$

$$\phi_1 = 2\pi\left(\frac{p_0 + p_2}{\lambda}\right) \quad [\text{EQ. 2}]$$

$$\phi_2 = 2\pi\left(\frac{p_3 + p_4}{\lambda}\right) \quad [\text{EQ. 3}]$$

$$\phi_3 = 2\pi\left(\frac{p_3 + p_4}{\lambda}\right) \quad [\text{EQ. 4}]$$

In EQS. 1-4, $\lambda$, indicates the wavelength of the transmitted signal and is assumed to be the same for signals transmitted by both transmitters 201 in nodes 210-1 and 210-2 in the exemplary case shown in FIG. 3.

If the position of the target 140 shown in FIG. 3 is designated as $u_0$, the vector of received signals (received at the four receivers 202 shown in FIG. 3), based on the phase differences discussed above, is given by:

$$a(u_0) = [e^{j\phi_0} e^{j\phi_1} e^{j\phi_2} e^{j\phi_3}] \quad [\text{EQ. 5}]$$

The vector elements indicate the angle of arrival (AOA) of the signal from the target 140. That is, for example, the elements of $a(u_0)$ shown in EQ. 5 correspond with the angle of arrival of signals from a position of the target 140 at $u_0$.

The vector shown in EQ. 5 would have N*m elements instead of four elements if the N nodes 210, shown in FIG. 2, with m receivers 202 each were used instead of the four receivers 202 shown in FIG. 3. Further, if there were q transmitters 201 per transceiver node 210, as previously noted, then the vector shown in EQ. 5 would have N*m*q elements. When the vector of received signals is obtained for K+1 different positions of the target 140 (i.e., for $u_0$, $u_1$, . . . , $u_k$), then a matrix A can be developed as:

$$A = [a(u_0) \; a(u_1) \; \ldots \; a(u_k)] \quad [\text{EQ. 6}]$$

As EQ. 6 indicates, each column of the A matrix is a vector $a(u_i)$.

Once the matrix A has been developed using distances travelled by transmitted signals for each target position of interest, as discussed above, the target position for a detected target 140 can be determined using a received signal y according to:

$$w = \|A^H y\| = [|a(u_0)^H y| \; |a(u_1)^H y| \; \ldots \; |a(u_0)^H y|] \quad [\text{EQ. 7}]$$

In EQ. 7, H refers to a Hermitian transpose. The vector y is obtained at block 230 based on determining phase differences at blocks 220. If there were no noise in the system at all, the vector y would be identical to $a(u_0)$ when the target 140 is at position $u_0$, the vector y would be identical to $a(u_1)$ when the target 140 is at position $u_1$, and so on. The vector w has the same number of elements as the number of columns of matrix A as indicated by EQ. 7, and each element of the matrix w is given by:

$$w_i = |a(u_i)^H y| \quad [\text{EQ. 8}]$$

That is, each column vector of the matrix A, which becomes a row vector based on the Hermitian transpose, is correlated with column vector y to provide one element in the vector w. The position of the target 140 is estimated as the index i of w for which EQ. 8 has a maximal value (i.e., the column of the matrix A which results in the element of vector w in EQ. 7 with the maximal value). As a result, the AOA of signals from the target 140 may be estimated by determining the element of the vector w with the maximal value.

Figure 4:
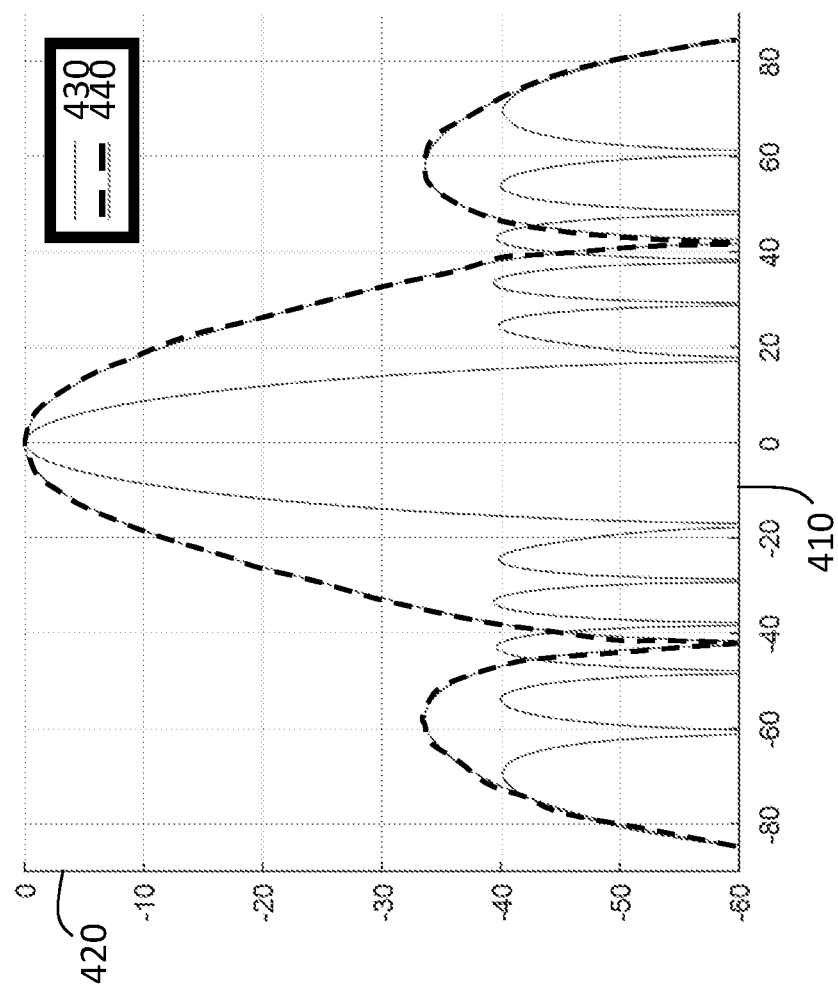
FIG. 4 indicates an improvement in target angle estimation according to one or more embodiments.

FIG. 4 indicates an improvement in AOA estimate according to one or more embodiments. The beamforming results (result of EQ. 8) are shown. Angles in degrees are indicated along axis 410, and amplitude in decibels (dB) is indicated along axis 420. The angular resolution with which AOA may be estimated is shown for a radar system with one transceiver node 210 (graph 440) and two transceiver nodes 210 (graph 430), each transceiver node 210 having two transmitters 201 and four receivers 202. As the graphs 430, 440 indicate, increasing the number of nodes 210 with their independent local reference signals 205 increases the angular resolution with which AOA may be estimated. That is, the graph 430, which is associated with two nodes 210, has a narrow range of angles associated with high amplitude (narrower beam) as compared with graph 440, which is associated with using only one node 210. This narrower angular beam indicates improved angular resolution, which enables the radar system 110 to estimate the angle of the target 140 reflection point with higher accuracy and also enables improved separation of reflections that are at close positions.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of determining angle of arrival of a target, comprising:
   transmitting a signal from each of one or more transmitters of each of two or more transceiver nodes, wherein the signal transmitted from each of the two or more transceiver nodes is generated based on a different local reference signal;
   receiving a resulting reflection signal at each of one or more receivers, wherein the receiving the resulting reflection signal is based on a transmission from a same one of the two or more transceiver nodes;
   determining obtained phase differences for each of the two or more transceiver nodes, wherein each of the obtained phase differences is between a signal transmitted by one of the one or more transmitters and received by one of the one or more receivers of a same one of the two or more transceiver nodes; and
   estimating the angle of arrival of the target based on the obtained phase differences determined for the two or more transceiver nodes.

2. The method according to claim 1, further comprising storing a matrix A, wherein each column of the matrix A is associated with a different target position and each row of the matrix A is associated with a different one of the one or more receivers of the two or more transceiver nodes.

3. The method according to claim 2, wherein storing the matrix A includes each column of the matrix A including a vector $a(u_i)$ associated with a target position $u_i$:

$$a(u_i) = [e^{j\phi_0}\ e^{j\phi_1}\ \ldots\ e^{j\phi_R}]^T, \text{ where}$$

T indicates transpose, each $\phi$ corresponds to an actual phase difference between a transmitted signal and a received signal with the same one of the two or more transceiver nodes when the target is at the target position $u_i$ and indexes 0 to R indicate a total of R receivers within the two or more transceiver nodes.

4. The method according to claim 2, further comprising obtaining a vector y based on the obtained phase differences.

5. The method according to claim 4, further comprising estimating the angle of arrival of the target using a vector w based on:

$$w = |A^H y|, \text{ where}$$

H indicates a Hermitian transpose.

6. The method according to claim 5, wherein estimating the angle of arrival using the vector w includes each element of the vector w corresponding with an angle of arrival for a different position of the target.

7. The method according to claim 5, further comprising determining the angle of arrival of the target based on which element of the vector w has maximal values.

8. The method according to claim 1, further comprising providing the angle of arrival of the target to a vehicle system that uses the angle of arrival of the target to perform autonomous driving, collision avoidance, or adaptive cruise control.

9. The method according to claim 1, wherein the transmitting the signal is at a frequency of 77 gigahertz.

10. A method of fabricating a system to determine angle of arrival of a target, the method comprising:
    assembling two or more transceiver nodes to each include one or more transmitters, one or more receivers, and one local oscillator configured to generate a local reference signal; and
    coupling a controller to the two or more transceiver nodes to determine the angle of arrival of the target based on determining obtained phase differences for each of the two or more transceiver nodes, wherein each of the obtained phase differences is between a signal transmitted by one of the one or more transmitters and received by one of the one or more receivers of a same one of the two or more transceiver nodes.

11. The method according to claim 10, further comprising coupling the system to a vehicle system in a vehicle, wherein the vehicle system is configured to use the angle of arrival of the target to perform autonomous driving, collision avoidance, or adaptive cruise control.

* * * * *